United States Patent

Pauwels et al.

[15] 3,677,610

[45] July 18, 1972

[54] ADAPTIVE BRAKING CONTROL VALVE

[72] Inventors: Edward M. Pauwels; James K. Roberts, both of South Bend, Ind.

[73] Assignee: The Bendix Corporation

[22] Filed: Nov. 16, 1970

[21] Appl. No.: 89,971

[52] U.S. Cl. .................................................. 303/21 F
[51] Int. Cl. ................................................ B60t 17/18
[58] Field of Search ....................................... 303/21 F

[56] References Cited

UNITED STATES PATENTS 3,495,881   2/1970   Harned et al. ................... 303/21 F

FOREIGN PATENTS OR APPLICATIONS 1,032,578   6/1966   Great Britain ................... 303/21 F
  839,945   4/1939   France ........................... 303/21 F Primary Examiner—Richard E. Aegerter
Assistant Examiner—Hadd S. Lane
Attorney—William N. Antonis and Plante, Hartz, Smith and Thompson

[57] ABSTRACT

A control valve for use in an adaptive braking system to modulate the pressure delivered to a braked wheel when a skid condition is sensed. The adaptive braking control valve will permit normal unobstructed flow of pressure from the driver's control valve to and from the wheel brake actuating device. Upon sensing an imminent skid condition by the adaptive braking system, a solenoid will be energized that allows a source of pressurized fluid to enter the control valve. The source of pressurized fluid in the control valve will move a diaphragm which closes the pressure received from the driver's control valve and, subsequently, reduces the pressure in the wheel brake actuating device. When an imminent skid condition no longer exists, the solenoid will de-energize thereby terminating the source of pressurized fluid from the control valve. The pressurized fluid acting against the diaphragm is decayed by a bleed orifice, thereby restoring normal communication between the driver's control valve and the wheel-brake actuating device. A small bypass is included to allow a slow pressure build rate in the wheel brake actuating device during the time interval between the stopping of normal communication and the reduction of pressure from the wheel brake actuating device.

10 Claims, 3 Drawing Figures

Patented July 18, 1972
3,677,610
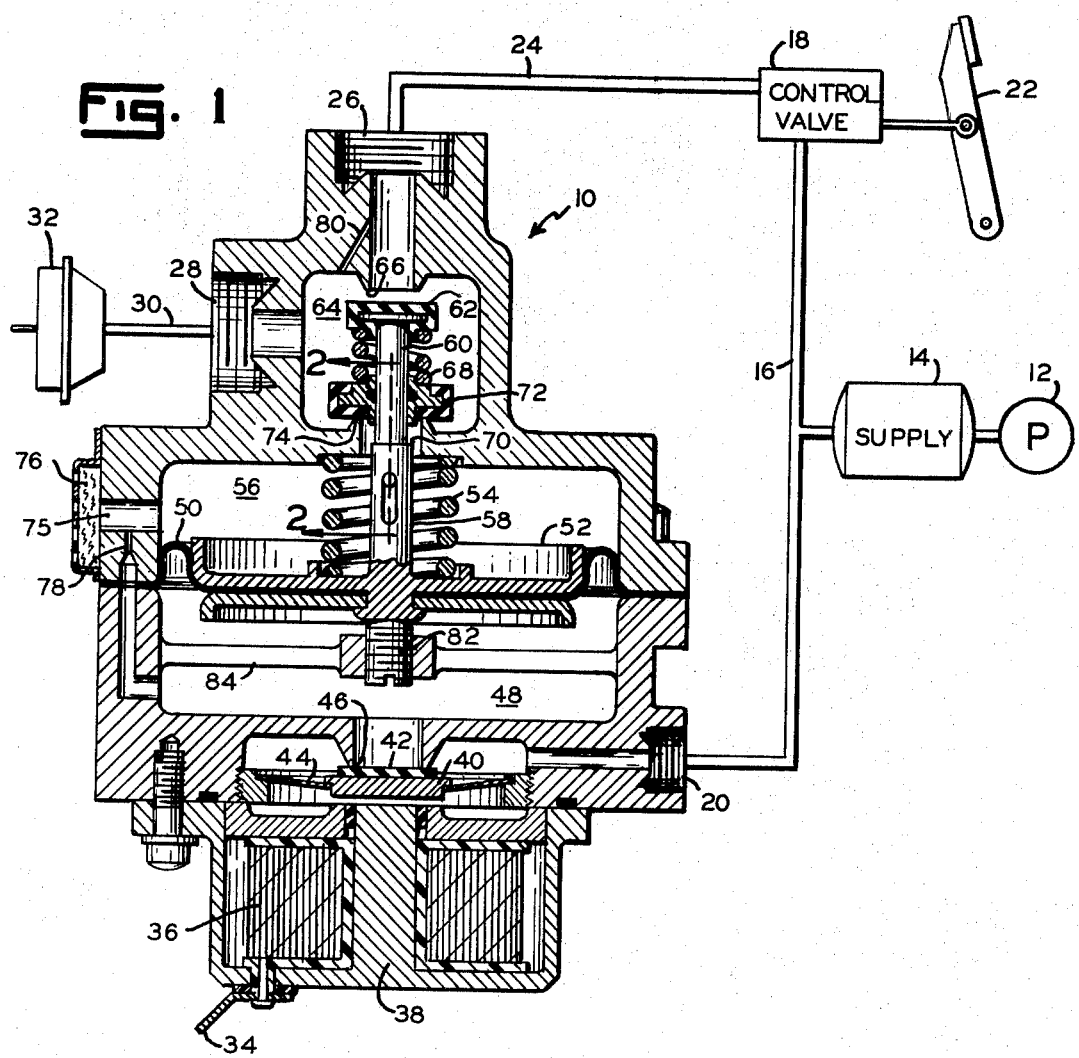
Fig. 1
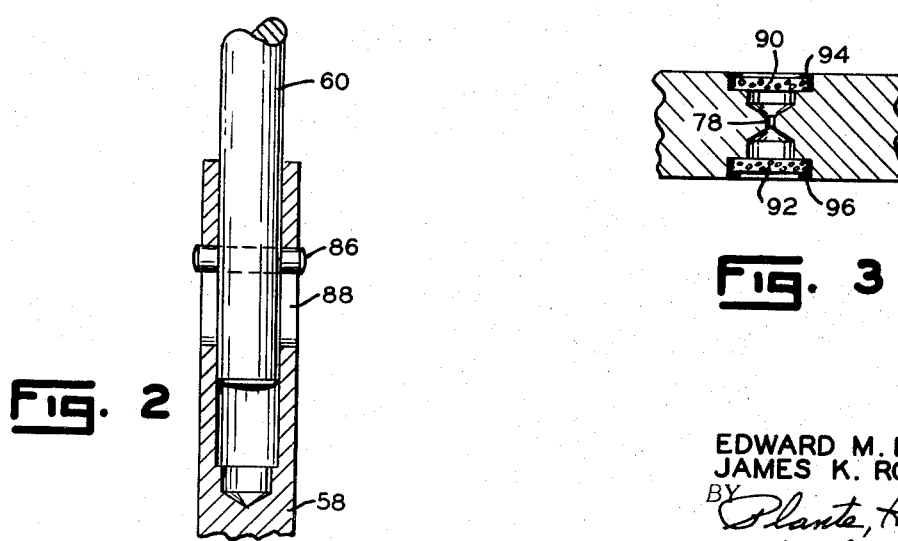
Fig. 2
Fig. 3
INVENTORS.
EDWARD M. PAUWELS
JAMES K. ROBERTS
BY Plante, Hartz, Smith
& Thompson
ATTORNEYS

ADAPTIVE BRAKING CONTROL VALVE

BACKGROUND OF THE INVENTION

Previous to the present invention many different types of devices have been proposed for use in pressurized braking systems such as pressurized air or full power braking systems. However, previous systems that would meet the fail-safe requirements established by the Department of Transportation were unduly complex and expensive. The present valve which is fail-safe, meaning that any failure or malfunction will automatically restore the device to the normal braking mode, is very economically made. The control valve is operated by a single solenoid that is energized when an imminent skid condition is sensed by the adaptive braking system. The solenoid opens a connection between a control chamber and a source of pressure, which for the present invention we will assume is pressurized air in a pneumatic braking system. The pressure inside the control chamber will move a diaphragm wall to stop communication with the driver's control valve and the brake actuating means and, subsequently, reduce pressure in the brake actuating means through another port in the control valve. Once the imminent skid condition has ceased, the solenoid will be de-energized and the pressurized fluid acting upon the diaphragm will be bled off to restore normal communication between the driver's control valve and the brake actuating means. A small bypass is included to give a slow build rate between the termination of flow from the driver's control valve to the brake actuating means and subsequent draining of pressurized fluid from the brake actuating means.

SUMMARY OF THE INVENTION

It is an object of the present invention to provide a valve which will permit the normal unobstructed flow from the driver's control valve to and from the brake actuating device until a skid condition is sensed.

It is a further object of the present invention to isolate the braked wheel during imminent skid condition from the vehicle's braking system, reduce the brake pressure applied to the braked wheel, and return the braked wheel to its normal braking condition when the imminent skid condition has passed.

It is an even further object of the present invention to provide a control valve where any failure or malfunction will automatically restore the device to the normal braking position.

It is a still further object of the present invention to provide an economic control valve with multiple pressure build rates.

BRIEF DESCRIPTION OF THE DRAWINGS

FIG. 1 is a pictorial block diagram of a pneumatic braking system with a cross-sectional view of the anti-skid control valve.

FIG. 2 is a cross-sectional view taken along line 2—2 of FIG. 1 to illustrate the telescopic arrangement.

FIG. 3 is the bleed orifice shown in FIG. 1 enclosed by filters to prevent any possibility of clogging.

DESCRIPTION OF THE PREFERRED EMBODIMENT

Referring now to FIG. 1 of the drawings, the anti-skid control valve represented generally by the reference numeral 10 is shown in a pneumatic braking system. A pump 12, which may be electrically operated or operated from the engine of an automotive vehicle, will pressurize the atmosphere in supply tank 14 to give a readily available source of pressurized fluid. It should be understood that the pressurized fluid contained in supply tank 14 could be either a gas or a liquid with some modifications in the anti-skid control valve 10. The supply tank is connected through conduit 16 to brake control valve 18 and control port 20 of the anti-skid control valve 10. When the vehicle operator pushes brake pedal 22, control valve 18 is opened to release pressure received from supply tank 14 to brake cylinder 32 via conduit 24, inlet port 26, chamber 64, outlet port 28, and conduit 30. Brake cylinder 32 will either directly operate the vehicle brake or will pressurize the fluid used to apply the brakes. During normal operation of the vehicle brakes, direct communication between the control valve 18 and the brake cylinder 32, which is used to actuate the vehicle brakes, gives an unobstructed actuating flow relationship.

However, once a skid condition is sensed by any suitable means known to those skilled in the art to give a skid signal as received by terminal 34 of solenoid coil 36, a magnetic field will be created through center portion 38. The other end of solenoid coil 36 is grounded to the housing to give a proper electrical ground. The magnetic field created in the center portion 38 will attract the armature 40 on which valve member 42 is attached. When the solenoid coil 36 is in the unenergized state, a disc spring 44 holds the valve member against valve seat 46 to prevent pressurized fluid from flowing from the supply tank 14 through the control port 20 into pressure chamber 48. The pressurized fluid from the supply tank 14 flows into pressure chamber 48 when the solenoid coil is energized to move valve member 42 away from its seat 46.

As the pressure in pressure chamber 48 increases, diaphragm 50 and support 52 will move against the spring bias 54 in return chamber 56. Attached to the support 52 are telescoping members 58 and 60 with member 60 extending into supply chamber 64. As the pressure in pressure chamber 48 moves diaphragm 50 and support 52 in the vertical direction, valve member 62 which is attached to telescoping member 60 will disestablish fluid communication through valve member 62 between inlet port 26 and outlet port 28 upon valve member 62 being seated against valve seat 66. Even though telescoping member 60 is in a slidable relationship with respect to telescoping member 58, spring 68 will tend to maintain two telescoping members 60 and 58 in their maximum extended position.

After valve member 62 has seated against seat 66, telescoping member 58 will continue to move in the upward direction with further pressure increases in chamber 48 while telescoping member 60 will be held fixed. Further upward movement of telescoping member 58 will bring shoulder 70 into an abutting relationship with valve member 72, thereby moving valve member 72 away from valve seat 74. Since the seating of valve member 62 has terminated communication between inlet port 26 and outlet port 28, the unseating of valve member 72 will establish communication between outlet port 28 and return chamber 56. Therefore, the pressurized fluid delivered to brake cylinder 32 will be decreased by decaying the pressurized fluid to return chamber 56 through a vent port 75 and suitable filter 76 communicating with the atmosphere. (If this were a hydraulic system, vent port 75 would connect to a fluid reservoir.) Due to the reduction in brake pressure in brake cylinder 32, the rotational velocity of the vehicle wheel (not shown) will approach the vehicle velocity, and the solenoid coil 36 will be de-energized because the incipient skid condition no longer exists. When solenoid coil 36 de-energizes disc spring 44 will move valve member 42 against seat 46 to terminate communication between control port 20, and pressure chamber 48 will be drained off through a bleed orifice 78 to the atmosphere. As the pressure in pressure chamber 48 decreases, support 52 and diaphragm 50 will return to their normal positions as shown in FIG. 1. By returning to their normal positions, valve member 72 will reseat itself against valve seat 74 and valve member 62 will move to its normally open position away from valve seat 66 to allow uninterrupted communication between inlet port 26 and outlet port 28. Valve member 72 will also seal against pressure leakage around telescoping member 60 extending therethrough.

As another feature of the anti-skid control valve 10, a bypass port 80 is included around seat 66 and valve member 62. When both valve members 62 and 72 are on their respective valve seats 66 and 74, bypass port 80 will still allow a gradual pressure increase from inlet port 26 to reach outlet port 28. This is essentially the same as the slow build rate in the more complicated adaptive braking systems. By proper selection of the size of chamber 48, the sensitivity of springs 54 and 68, and the proper size valve seat 46, the time duration of the slow build can be accurately set. Adjustable stop 82 in radial element 84 will adjust spring 54 and set the position of diaphragm 50 which controls the size of chamber 48.

For further explanation of the telescoping arrangement of members 60 and 58, refer to FIG. 2 which is a cross-sectional view taken along section line 2—2 of FIG. 1. Telescoping member 60 is essentially a cylinder with a pin 86 extending therethrough. Telescoping member 60 fits into a cylindrical portion of telescoping member 58, with pin 86 being allowed to slide along a vertical slot 88 of the cylinder portion.

To prevent any possibility of pressure being trapped in pressure chamber 48 by the clogging of bleed orifice 78, attention is directed to FIG. 3. In FIG. 3, orifice 78 is enclosed by filters 90 and 92 which are retained by force fit rings 94 and 96, respectively. These filter 90 and 92 would prevent any possibility of clogging bleed orifice 78. However, it should be pointed out that many tolerances within the braking system are much finer than the tolerance in the bleed orifice 78. Therefore, it may be an unrealistic requirement to require protection of bleed orifice 78 against being clogged. Another alternate possibility, though not specifically shown in the present disclosure, would be the inclusion of a needle that would move through bleed orifice 78 to remove any particles that may become lodged therein. The movement of the needle could be controlled by armature 40.

It should be emphasized that the present anti-skid control valve 10 is essentially fail-safe. For example, if the diaphragm 50 should rupture, the pressure delivered by supply tank 14 to pressure chamber 48 would simply be vented to the atmosphere through return chamber 56, and valve member 62 and 72 would remain in their normal position so that operator control of the braking system still remains. The only possibility of system failure would come if pressure were trapped in the pressure chamber 48. However, this possibility has been eliminated by proper filtering or any other suitable means to insure that the bleed orifice 78 will remain open. If the solenoid coil 36 does not receive a signal which indicates a skid condition exists, even though the skid condition may in actuality exist, complete operator control of the braking system still remains. It is not intended to be a part of this invention to insure that the signal received by the solenoid coil in actual practice represents a skid condition. This invention is directed towards making the valve fail-safe and economic to manufacture.

We claim:

1. An anti-skid valve for an adaptive braking system having a control valve for supplying a pressurized fluid to a brake actuating means to apply the brakes in said adaptive braking system, said anti-skid valve comprising:

a housing having inlet and outlet ports and a control port, said inlet port being in normal communication with said outlet port through a supply chamber to furnish said pressurized fluid to said brake actuating means;

said control port being connected to a source of pressurized fluid;

diaphragm means in said housing for dividing a chamber into a pressure chamber and a return chamber;

said return chamber being vented to a relatively low pressure fluid source;

control means connecting said control port to said pressure chamber when a skid condition is imminent and terminating the connection when the danger of skidding no longer exists;

dual valve means in said supply chamber interposed between said inlet and outlet ports, said dual valve means being operatively connected to said diaphragm means wherein a first valve and a second valve of said dual valve means are operated in response to said pressurized fluid being supplied to said pressure chamber by said control means via said control port when said imminent skid condition exists, said first valve of said dual valve means stopping said normal communication between said inlet port and said outlet port, said second valve of said dual valve means subsequently reducing said pressurized fluid delivered to said brake actuating means by connecting said supply chamber to said return chamber; and means for reducing said pressure in said pressure chamber when the connection between said control port and said pressure chamber has been terminated by said control means to restore normal braking, normal braking being when said first valve of said dual valve means is open and said second valve of said dual valve means is closed;

said cycle being repeated if said imminent skid condition returns.

2. The anti-skid valve, as set forth in claim 1, further comprising bypass means around said first valve of said valve means to allow gradual pressure increase in said supply chamber and said brake actuating means after said first valve of said dual valve means has closed but before said second valve of said dual valve means has opened.

3. The anti-skid valve, as set forth in claim 2, wherein said reducing means is a bleed orifice with suitable means to prevent clogging of said bleed orifice.

4. The anti-skid valve, as set forth in claim 2, wherein said control means is a solenoid operated valve with the solenoid coil receiving an electrical skid signal to operate said solenoid valve.

5. The anti-skid valve, as set forth in claim 4, further comprising telescoping means for operatively connecting said dual valve means to said diaphragm means, said telescoping means closing said first valve of said dual valve means and subsequently opening said second valve of said dual valve means when said imminent skid condition exists.

6. The anti-skid valve, as set forth in claim 5, wherein said telescoping means has a first and a second member, said first member being connected to said first valve of said dual valve means to close said first valve of said valve means as pressure in said pressure chamber increases and said second member being angularly disposed in a biased, slidable relationship with respect to said first member to open said second valve of said dual valve means subsequent to the closing of said first valve, said subsequent opening being dependent upon a further pressure increase in said pressure chamber.

7. The anti-skid valve, as set forth in claim 6, wherein said diaphragm means is biased towards said pressure chamber.

8. The anti-skid valve, as set forth in claim 2, wherein said control means includes a coil for creating magnetic flux in response to an electric skid signal, said magnetic flux attracting an armature normally biased away from said coil to move a valve member attached thereto, movement of said valve member thereby establishing communication between said control port and said pressure chamber.

9. An anti-skid pressure modulating valve for use in an adaptive braking system operated from a source of pressurized fluid, said valve comprising:

means for communicating pressurized fluid from a brake control valve to a brake actuating means unless a skid condition is sensed;

solenoid valve means energized by an electric signal when said skid condition is sensed, said solenoid valve means connecting said source of pressurized fluid to a chamber in said anti-skid pressure modulating valve to stop said skid condition;

diaphragm means contained in said chamber and moving in response to said source of pressurized fluid;

first and second valve means connected to said diaphragm means with said first valve means interrupting said communicating means when said diaphragm means moves a first predetermined distance, and said second valve means opening to return said pressurized fluid from said brake actuating means to reduce brake pressure as said diaphragm means moves a second predetermined distance;

drain means for reducing pressure in said chamber when said skid condition no longer exists and said solenoid valve means is de-energized, said first and second valve means being returned to their normal position; and means for bypassing said interruption by said first valve means, said bypassing means allowing a slow increase in brake pressure during the time interval between the closing of said first valve means and the opening of said second valve means and, vice versa, between the closing of said second valve means and the opening of said first valve means.

10. The anti-skid pressure modulating valve, as set forth in claim 9, wherein said drain means is a bleed orifice with a suitable means to prevent clogging of said bleed orifice.

* * * * *